United States Patent
Kamada et al.

(10) Patent No.: US 9,948,824 B2
(45) Date of Patent: Apr. 17, 2018

(54) IMAGE COMPRESSING DEVICE, IMAGE FORMING APPARATUS, IMAGE COMPRESSING METHOD, AND RECORDING MEDIUM

(71) Applicants: Takuji Kamada, Kanagawa (JP); Satoshi Ouchi, Tokyo (JP)

(72) Inventors: Takuji Kamada, Kanagawa (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/460,571

(22) Filed: Mar. 16, 2017

(65) Prior Publication Data
US 2017/0272613 A1 Sep. 21, 2017

(30) Foreign Application Priority Data
Mar. 18, 2016 (JP) .................. 2016-055706

(51) Int. Cl.
*H04N 1/04* (2006.01)
*H04N 1/411* (2006.01)
(Continued)

(52) U.S. Cl.
CPC ......... *H04N 1/4115* (2013.01); *H04N 1/4172* (2013.01); *H04N 1/4175* (2013.01); *H04N 1/64* (2013.01); *H04N 2201/0081* (2013.01)

(58) Field of Classification Search
CPC ........ G07F 7/086; G07F 17/16; G07F 7/1008; G10L 19/018; G11B 20/00891; G11B 27/034; G11B 27/105; G11B 27/28; G11B 27/3027; G11B 27/34; G11B 20/00086; G11B 20/00884; H04W 4/025; B42D 25/00

USPC ......... 382/232, 239; 358/2.1, 534, 1.1, 1.13, 358/1.15, 1.17, 1.2, 3.26, 3.28, 426.01, 358/426.04, 426.12, 462, 463, 464, 474, 358/518, 519, 523, 539; 375/E7.089, 375/E7.137, E7.176, E7.026, E7.072, 375/E7.077, E7.082, E7.088, E7.129,
(Continued)

(56) References Cited

U.S. PATENT DOCUMENTS 5,867,593 A * 2/1999 Fukuda .............. H04N 1/40062
358/462
5,872,864 A * 2/1999 Imade ................ G06K 9/00456
382/156
(Continued)

FOREIGN PATENT DOCUMENTS

JP 4861711 11/2011
JP 2017041694 A 2/2017
(Continued)

*Primary Examiner* — Negussie Worku
(74) *Attorney, Agent, or Firm* — Harness, Dickey & Pierce, P.L.C.

(57) ABSTRACT

An image compressing device includes: a histogram creating unit configured to create a histogram regarding an input image; an original type recognizing unit configured to recognize an original type of the input image using the histogram; and an image compressing unit configured to perform a compression process for creating a high-compressed image file from the input image and to control a compression mode of the compression process depending on at least the original type recognized by the original type recognizing unit.

20 Claims, 17 Drawing Sheets

(51) Int. Cl.
*H04N 1/417* (2006.01)
*H04N 1/64* (2006.01)

(58) Field of Classification Search
USPC .......... 375/E7.154, E7.162, E7.166, E7.168, 375/E7.178, E7.181, E7.182, E7.189
See application file for complete search history.

(56) References Cited

U.S. PATENT DOCUMENTS

| | | | | |
|---|---|---|---|---|
| 6,104,833 | A * | 8/2000 | Naoi | G06K 9/6807 382/177 |
| 7,199,829 | B2 * | 4/2007 | Matsui | H04N 1/6011 348/333.02 |
| 8,086,050 | B2 * | 12/2011 | Schwartz | G06T 7/194 345/555 |
| 8,224,101 | B2 * | 7/2012 | Tamura | H04N 1/64 382/170 |
| 8,363,946 | B2 * | 1/2013 | Arakawa | G06K 7/14 382/181 |
| 8,466,987 | B2 * | 6/2013 | Walker | G11B 27/034 348/231.7 |
| 2007/0025627 | A1 | 2/2007 | Hasegawa et al. | |
| 2008/0187235 | A1 * | 8/2008 | Wakazono | H04N 5/2355 382/255 |
| 2009/0021601 | A1 * | 1/2009 | Tanaka | H04N 5/243 348/222.1 |
| 2009/0141310 | A1 * | 6/2009 | Matsuoka | H04N 1/40062 358/3.06 |
| 2010/0128332 | A1 * | 5/2010 | Wakazono | G06T 5/009 358/521 |
| 2011/0243591 | A1 * | 10/2011 | Tanimura | B41J 2/2114 399/54 |
| 2012/0242844 | A1 * | 9/2012 | Walker | G11B 27/034 348/207.1 |
| 2015/0242701 | A1 * | 8/2015 | Tokui | H04N 5/243 382/190 |
| 2016/0117806 | A1 * | 4/2016 | Hayashi | G06T 5/003 382/218 |
| 2017/0054873 | A1 * | 2/2017 | Ouchi | H04N 1/411 |
| 2017/0200283 | A1 * | 7/2017 | Yamaguchi | G06T 7/571 |

FOREIGN PATENT DOCUMENTS

| | | |
|---|---|---|
| JP | 2017117331 A | 6/2017 |
| JP | 2017118299 A | 6/2017 |
| JP | 2017118433 A | 6/2017 |
| JP | 2017118480 A | 6/2017 |

* cited by examiner

| 0 | -1 | 0 |
|---|---|---|
| -1 | 4 | -1 |
| 0 | -1 | 0 |

FIG.9

$$f\left(\text{Max}\left(\begin{vmatrix} 1 & 1 & 1 & 1 & 1 \\ 1 & 1 & 1 & 1 & 1 \\ 0 & 0 & 0 & 0 & 0 \\ -1 & -1 & -1 & -1 & -1 \\ -1 & -1 & -1 & -1 & -1 \end{vmatrix} \cdot I, \begin{vmatrix} 1 & 1 & 0 & -1 & -1 \\ 1 & 1 & 1 & -1 & -1 \\ 1 & 1 & 0 & -1 & -1 \\ 1 & 1 & 0 & -1 & -1 \\ 1 & 1 & 0 & -1 & -1 \end{vmatrix} \cdot I\right)\right)$$

1. COAL BLACK
2. BLACK
3. INTERMEDIATE COLOR
4. GRAY (NEWSPAPER BACKGROUND)
5. WHITE

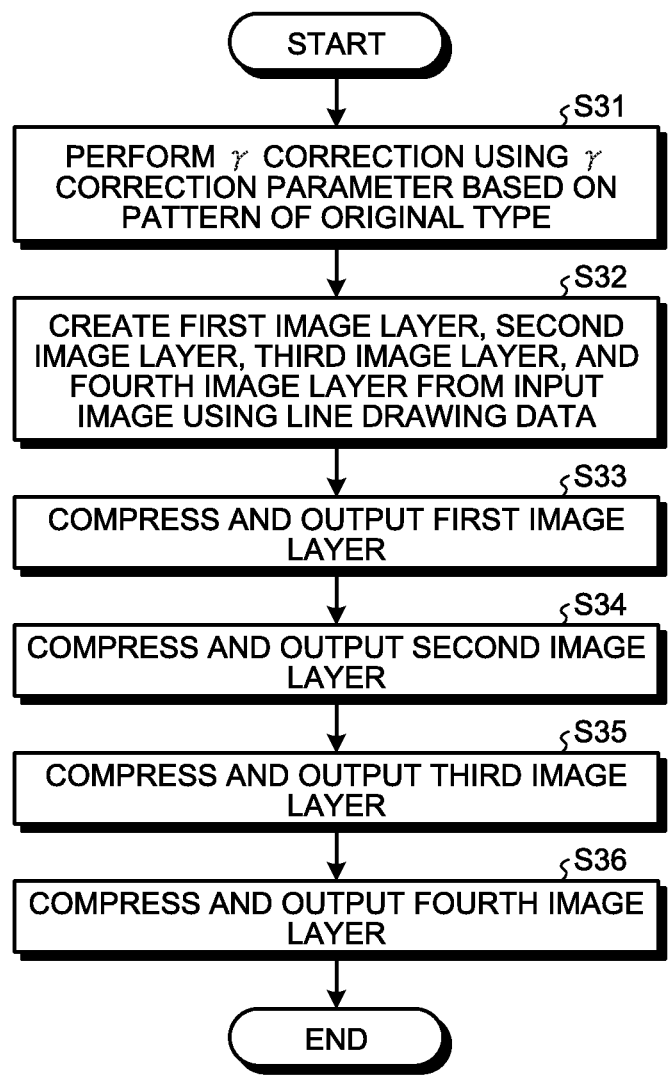

| | RESOLUTION | | | |
|---|---|---|---|---|
| | BACK-GROUND | FORE-GROUND | COLOR CHARACTER | BLACK CHARACTER |
| OTHER ORIGINAL | 1/2 | 1/8 | 1 | 1 |
| THIN ORIGINAL | 1/2 | 1/8 | 1 | 1 |
| NEWSPAPER ORIGINAL | 1/4 | 1/8 | 1 | 1 |
| ONLY-CHARACTER ORIGINAL | 1/4 | 1/8 | 1 | 1 |

*1: DOT DIVISION RESULT 1
*2: DOT DIVISION RESULT 2

FIG.22

|  | RESOLUTION | | | |
|---|---|---|---|---|
|  | BACK-GROUND | FORE-GROUND | COLOR CHARACTER | BLACK CHARACTER |
| THIN ORIGINAL (a) | 1/2 | 1/8 | 1 | 1 |
| THIN ORIGINAL (b) | 1/2 | 1/8 | 1 | 1 |
| THIN ORIGINAL (c) | 1/2 | 1/8 | 1 | 1 |
| THIN ORIGINAL (d) | 1/4 | 1/8 | 1 | 1 |
| THIN ORIGINAL (e) | 1/8 | 1/8 | 1 | 1 |
| THIN ORIGINAL (f) | 1/8 | 1/8 | 1 | 1 |

IMAGE COMPRESSING DEVICE, IMAGE FORMING APPARATUS, IMAGE COMPRESSING METHOD, AND RECORDING MEDIUM

CROSS-REFERENCE TO RELATED APPLICATIONS

The present application claims priority under 35 U.S.C. § 119 to Japanese Patent Application No. 2016-055706, filed on Mar. 18, 2016. The contents of which are incorporated herein by reference in their entirety.

BACKGROUND OF THE INVENTION

1. Field of the Invention

The present invention relates to an image compressing device, an image forming apparatus, an image compressing method, and a recording medium.

2. Description of the Related Art

In the related art, high-compressed PDF is known as a technique of increasing a compression ratio of a PDF file and achieving more improvement in image quality. In the high-compressed PDF, a technique of dividing an image into a character area and a picture area and performing compression processes (MMR, JPEG, and the like) which are each suitable for one of the character area and the picture area, to realize high compression is known.

A technique of determining attributes of an original as a whole is generally referred to as an original type recognition technique. In creating a high-compressed PDF file, it is also known that an original type is determined using the original type recognition technique to switch processing (for example, a threshold value of a binarization process is switched or an appropriate compression method is selected) to be suitable for the original type.

In creating a high-compressed PDF file, there are following original types as original types which are expected to achieve improvement in image quality by switching processing to be suitable for the original type determined using the original type recognition technique.

Only-character original
Newspaper original
Thin original

Particularly, with a recent increase in environmental consciousness, the number of cases in which an original is copied or printed in a toner save mode in reproducing an image using a copier increases. When a printed image in the toner save mode is scanned as an original and a high-compressed PDF file is created in this way, the original becomes a "thin original."

However, according to the original type recognition technique according to the related art, there is a problem in that a determination circuit is necessary for each original type and processing costs increase. There is also a problem in that the original type recognition technique and the compression technique according to the related art cope with an "only-character original" and a "newspaper original," but do not cope with the other original types (for example, a "thin original").

SUMMARY OF THE INVENTION

According to one aspect of the present invention, an image compressing device includes a histogram creating unit, an original type recognizing unit, and an image compressing unit. The histogram creating unit is configured to create a histogram regarding an input image. The original type recognizing unit is configured to recognize an original type of the input image using the histogram. The image compressing unit is configured to perform a compression process for creating a high-compressed image file from the input image and to control a compression mode of the compression process depending on at least the original type recognized by the original type recognizing unit.

BRIEF DESCRIPTION OF THE DRAWINGS

FIG. 8 is a schematic diagram illustrating an example of a Laplacian;

FIG. 9 is a schematic diagram illustrating an example of an edge quantity filter;

FIG. 14 is a flowchart illustrating an example of a flow of an image compressing process in an image compressing unit;

FIG. 22 is a diagram illustrating resolutions of layers which are changed depending on the patterns of the thin original type.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
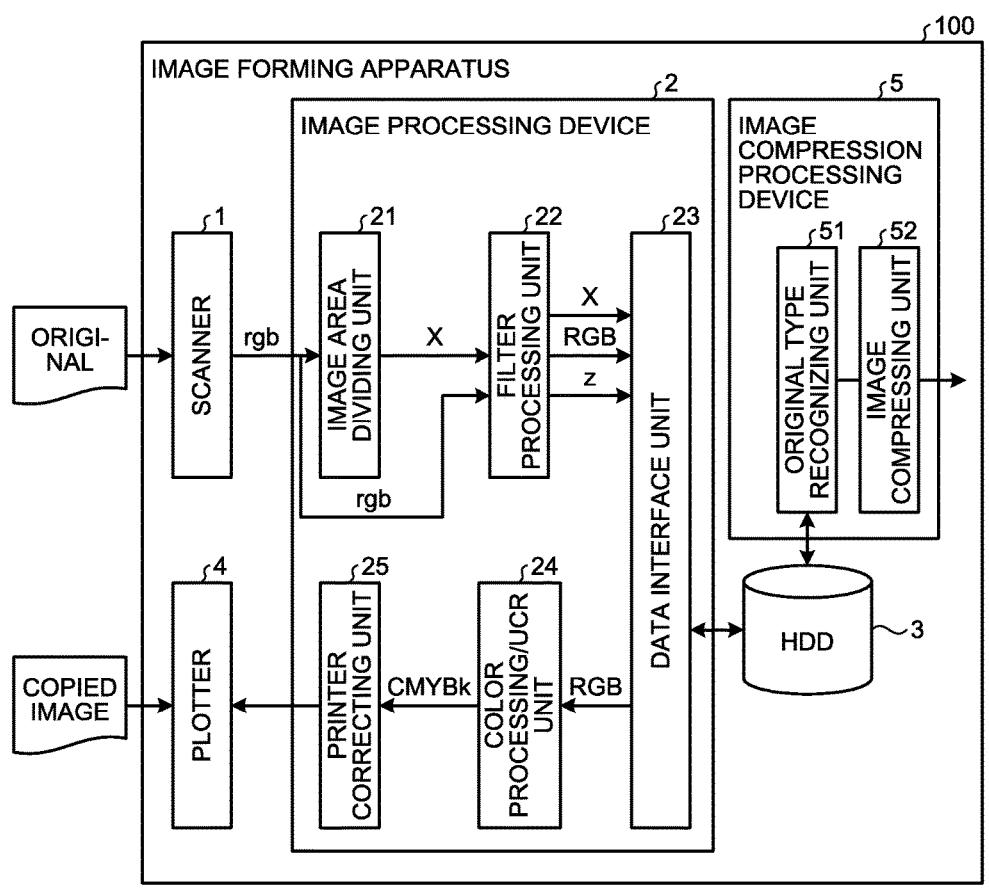
FIG. 1 is a block diagram illustrating a configuration of an image forming apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments of an image compressing device, an image forming apparatus, an image compressing method, and a recording medium will be described in detail with reference to the accompanying drawings. In the embodiments, a multifunction peripheral having at least two functions of a copier function, a printer function, a scanner function, and a facsimile function will be described as an example of a digital color image forming apparatus including an image compressing device.

An embodiment has an object to control a compression mode associated with a compression process of creating a high-compressed image file depending on a recognized original type (for example, only-character original/newspaper original/thin original/other originals) to realize high image quality, high compression, and fast compression.

First Embodiment

FIG. 1 is a block diagram illustrating a configuration of an image forming apparatus 100 according to a first embodiment. First, in signals and out signals of units constituting the image forming apparatus 100 will be mainly described with reference to FIG. 1 and internal details of the units will be described later if necessary.

As illustrated in FIG. 1, the image forming apparatus 100 includes a scanner 1, an image processing device 2, a hard disk drive (HDD) 3, a plotter 4, and an image compression processing device 5 that creates a high-compressed PDF file (a high-compressed image file).

The scanner 1 is a device that reads image data from an original. The scanner 1 sends out the read image data (8-bit signals for each color of r, g, and b subjected to A/D conversion: reflectance-linear signals) to the image processing device 2.

The image processing device 2 includes an image area dividing unit 21, a filter processing unit 22, a data interface unit 23, a color processing/UCR unit 24, and a printer correcting unit 25.

The image area dividing unit 21 divides an image area into a character area and a picture area using the image data (r, g, and b) read by the scanner 1. An X signal output from the image area dividing unit 21 is a two-bit signal (a character/non-character area signal, a color/non-color area signal). The X signal is output to and stored in the HDD 3 via the filter processing unit 22 and the data interface unit 23.

The filter processing unit 22 performs spatial filtering on the image data (r, g, and b) read by the scanner 1. An output signal (an RGB signal, a z signal) subjected to the spatial filtering in the filter processing unit 22 is output to and stored in the HDD 3 via the data interface unit 23. The z signal is a signal indicating an edge area, though details thereof will be described later.

The RGB signal subjected to the spatial filtering is sent to the color processing/UCR unit 24 via the data interface unit 23. The color processing/UCR unit 24 converts the 8-bit RGB signals into image signals (8 bits for each color of C, M, Y, and Bk) which are control signals of the plotter 4 on the basis of a predetermined conversion formula and sends the converted image signals to the printer correcting unit 25.

The printer correcting unit 25 preforms γ correction process and pseudo halftone processing reflecting gradation characteristics of the plotter 4 on the image signals of C, M, Y, and Bk and outputs the resultant image signals to the plotter 4.

The plotter 4 which is a transfer printing unit transfer-prints the image signals output from the image processing device 2.

Figures 2, 3A, 3B, 3C:
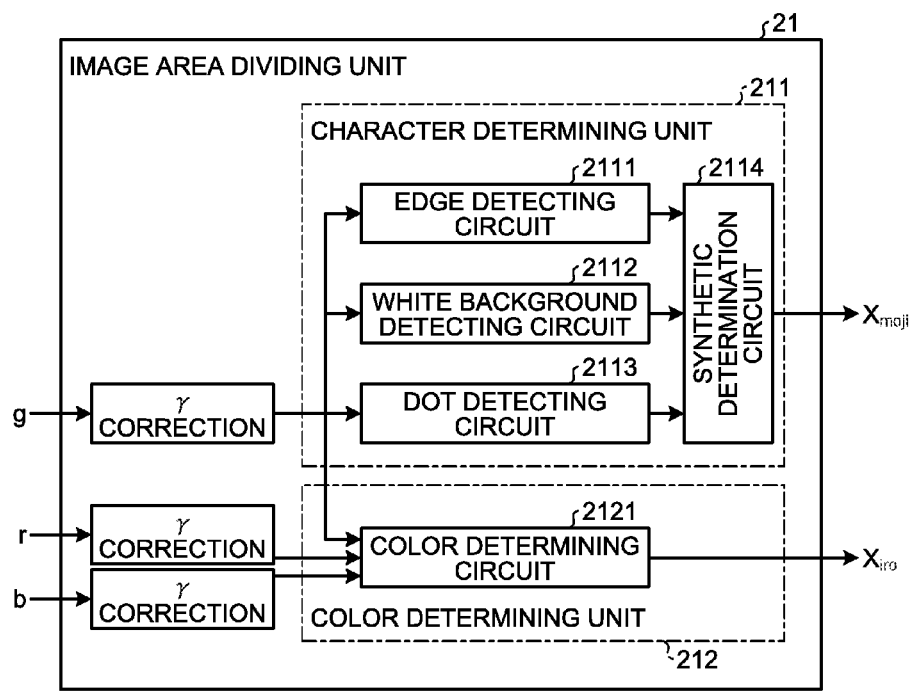
FIG. 2 is a block diagram illustrating a configuration of an image area dividing unit.
FIGS. 3A to 3C are diagrams illustrating a pixel comparison direction in a matrix of M×M pixels.

The image area dividing unit 21 of the image processing device 2 will be described below. FIG. 2 is a block diagram illustrating the configuration of the image area dividing unit 21. As illustrated in FIG. 2, the image area dividing unit 21 performs a one-dimensional conversion process (the γ correction processing) for adjusting gradation balance for each color on the image data (8 bits for each color of r, g, and b subjected to A/D conversion: reflectance-linear signals) read by the scanner 1.

The image area dividing unit 21 includes a character determining unit 211 and a color determining unit 212. Density-linear signals (RGB signals in which a signal value indicating white is set to 0) subjected to the γ correction are sent to the character determining unit 211 and the color determining unit 212.

The character determining unit 211 includes an edge detecting circuit 2111, a white background detecting circuit 2112, a dot detecting circuit 2113, and a synthetic determination circuit 2114.

The edge detecting circuit 2111 performs a process of determining an edge (on the basis of continuity of white pixels and black pixels) with respect to the density-linear signal (G) subjected to the γ correction to detecting an edge of a line drawing candidate and outputs the result (hereinafter referred to as an "edge detection result") to the synthetic determination circuit 2114. The edge detecting circuit 2111 divides line drawing such as a character and a dot, for example, using continuity of black pixels or white pixels or patterns which are acquired by three-value conversion of an input image signal, to detect an edge constituting the line drawing candidate. The output signal of the edge detecting circuit 2111 is one bit for one pixel and a detected edge-area pixel is set to be active.

The white background detecting circuit 2112 determines whether the density-linear signal (G) subjected to the γ correction has a white background or a non-white background and outputs the determination result to the synthetic determination circuit 2114. For example, the white background detecting circuit 2112 binarizes the input image signal into white pixels and black pixels using a predetermined threshold value and determines that the signal has a white background when white pixels are present on right and left sides or upper and lower sides of a pixel of interest. At this time, by controlling sizes of reference areas on the right, left, upper, and lower, a character edge portion with a desired line width or less can be determined to be a white background and a character edge portion with a line width greater than the desired line width can be determined to be a non-white background. In the output signal of the white background detecting circuit 2112, the white background is set to be active.

The dot detecting circuit 2113 performs dot determination (determination based on a repeated pattern of mountain/valley peak pixels in an image) on the pixels of the density-linear signal (G) subjected to the γ correction, and outputs the result to the synthetic determination circuit 2114.

Figures 4, 5:
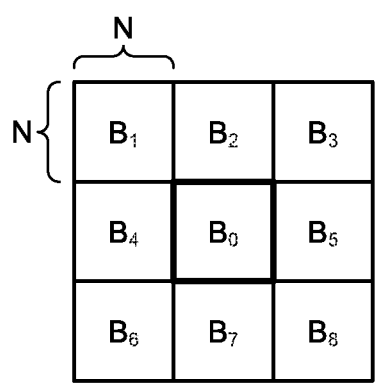
FIG. 4 is a diagram illustrating an example of a block including N×N pixels.
FIG. 5 is a diagram illustrating a relationship between a block of interest and neighboring blocks.

More specifically, the dot detecting circuit 2113 sequentially applies a predetermined matrix of M×M pixels such as a matrix with a size of 3×3 pixels (M=3), a matrix with a size of 4×4 pixels (M=4), or a matrix with a size of 5×5 pixels (M=5) as illustrated in FIGS. 3A to 3C to the pixels of the density-linear signal (G) subjected to the γ correction, and detects whether a center pixel $m_0$ (see FIGS. 3A to 3C) of the matrix is a peak indicating a mountain or a valley of a density variation on the basis of a density relationship with neighboring pixels $m_1$ to $m_t$. The dot detecting circuit 2113 divides an image in the unit of a block B including N×N pixels (where N>M), for example, a block B having a size of 9×9 pixels (N=9) as illustrated in FIG. 4.

The dot detecting circuit 2113 counts the number of peak pixels indicating a mountain and the number of peak pixels indicating a valley for each block and determines the number of peak pixels having the larger counted value as the number of peak pixels of the corresponding block. Thereafter, the dot detecting circuit 2113 determines whether a center pixel $n_0$ (see FIG. 4) of the block of interest $B_0$ or all pixels $n_0$ to $n_{80}$ in the block of interest $B_0$ belong to a dot area on the basis of the relationship between the number of peak pixels $P_0$ of the block of interest $B_0$ illustrated in FIG. 5 and the number of peak pixels P of neighboring blocks $B_1$ to $B_8$ on upper/lower and right/left oblique sides around the block of interest. In the output signal of the dot detecting circuit 2113, the dot area is set to be active.

When the pixel of interest is determined to be active by the edge detecting circuit 2111, is determined to be active by the white background detecting circuit 2112, and is determined to be non-active by the dot detecting circuit 2113, the synthetic determination circuit 2114 outputs a determination result $X_{moji}$ (a character/non-character [picture]) indicating that the pixel of interest is a character area as an X signal.

The color determining unit 212 includes a color determining circuit 2121. The color determining circuit 2121 determines whether a pixel block of interest (4×4 pixels) is a chromatic block or an achromatic block in the density-linear signals (R, G, and B) subjected to the γ correction.

More specifically, the color determining circuit 2121 detects, for example, a pixel corresponding to Max (|R−G|, |G−B|, |B−R|)>th (where th is a predetermined threshold value) as a chromatic pixel, and outputs a determination result $X_{iro}$ (a chromatic color/achromatic color) in which a block of 4×4 pixels if any chromatic pixel is present is an active block as an X signal.

Figure 6:
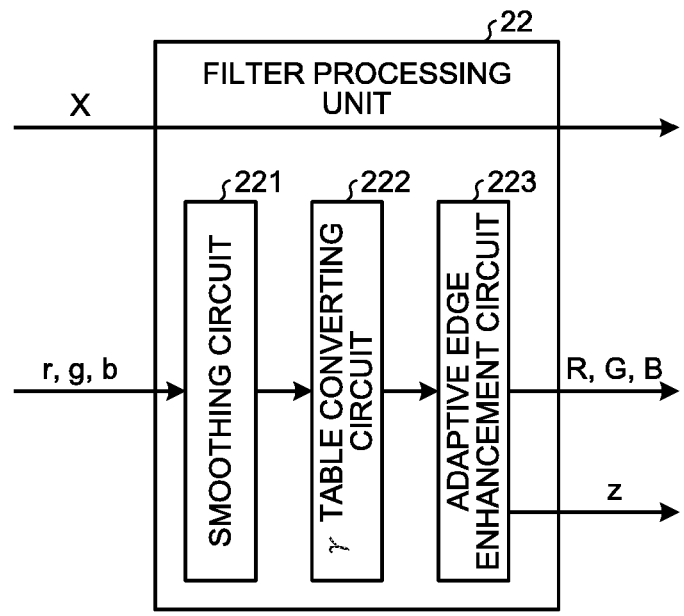
FIG. 6 is a block diagram illustrating a configuration of a filter processing unit.

The filter processing unit 22 of the image processing device 2 will be described below. FIG. 6 is a block diagram illustrating the configuration of the filter processing unit 22. As illustrated in FIG. 6, the filter processing unit 22 includes a smoothing circuit 221 as a smoothing unit, a γ table converting circuit 222, and an adaptive edge enhancement circuit 223 as an edge enhancement unit. The filter processing unit 22 performs a smoothing process on a picture area of an image particularly in consideration of dots. On the other hand, the filter processing unit 22 performs an edge enhancement process on an edge portion of the image particularly in consideration of character edges.

The smoothing circuit 221 performs a spatial filtering process of removing dots more than a specific number of lines from the image data (r, g, and b: reflectance-linear signals) read by the scanner 1. More specifically, the smoothing circuit 221 performs the smoothing process on the image data read by the scanner 1. The smoothing filter is a filter having characteristics of almost removing the frequency of dots greater than 100 lines (3.9 lps/mm) in the vicinity of 100 lines of a cutoff frequency and almost completely leaving the less frequencies. Accordingly, it is possible to prevent occurrence of moiré in a dot original and to further decrease noise in a photograph original.

The γ table converting circuit 222 performs a one-dimensional conversion process (the γ correction processing) of converting a reflectance-linear signal into a density-linear signal.

The adaptive edge enhancement circuit 223 does not perform edge enhancement on the entire image, but performs an edge enhancement process of enhancing only an edge portion of the image. The reason for not performing the edge enhancement on the entire image is to prevent dots removed by the smoothing circuit 221 from being restored.

The filter processing unit 22 can reproduce the character area to be thin and clear while efficiently removing dots, by changing attributes of a signal between the smoothing process and the edge enhancement process.

Figure 7:
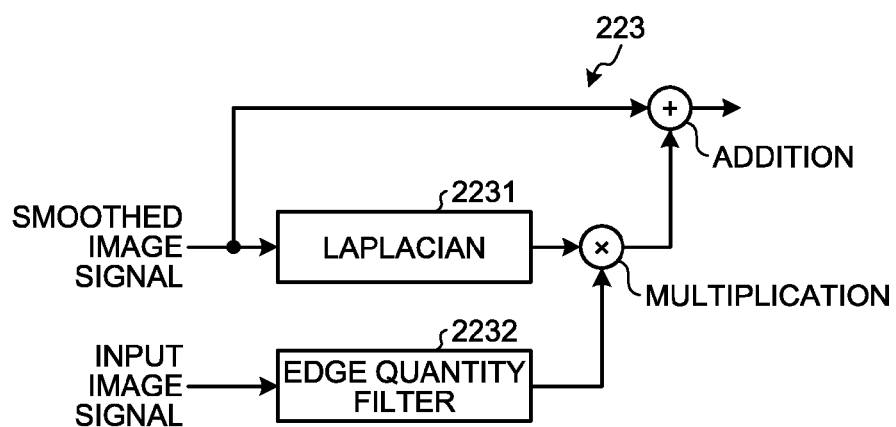
FIG. 7 is a block diagram illustrating a configuration of an adaptive edge enhancement circuit.

FIG. 7 is a block diagram illustrating the configuration of the adaptive edge enhancement circuit 223. As illustrated in FIG. 7, the adaptive edge enhancement circuit 223 extracts an edge from a density-linear smoothed image signal using a Laplacian (an edge enhancement filter) 2231. FIG. 8 is a schematic diagram illustrating an example of the Laplacian 2231. The Laplacian 2231 magnifies the pixel of interest to four times and take the difference from four neighboring pixels to extract an edge. The extraction of an edge based on the density-linear signal is effective for reproducing a dot character and a character on a color background to be thin and clear.

The Laplacian 2231 applies a filter with characteristics having power all over the spatial frequency to the area detected as an edge, to acquire a high-quality character image on dots.

The adaptive edge enhancement circuit 223 calculates an edge quantity of the input image signal (r, g, and b: a reflectance-linear signal) read by the scanner 1 using the edge quantity filter 2232. FIG. 9 is a schematic diagram illustrating an example of the edge quantity filter 2232. The edge quantity filter 2232 illustrated in FIG. 9 is an example in which a first differential filter is applied to a pixel of interest and neighboring pixels thereof. That is, the edge quantity filter serves to take the absolute value of a first differential in the x direction of the input image data I and the absolute value of the first differential in the y direction and set the maximum value thereof as the edge quantity, and f is a function of normalizing the maximum value to 1.

The difference in spatial frequency between the edge quantity filter 2232 and the Laplacian 2231 is that the power of the edge quantity filter 2232 is smaller than the power of the Laplacian 2231 in a high frequency range. This is intended not to detect a dot in a dot character as an edge as much as possible and to increase the edge quantity of a dot character edge. Accordingly, the dots are smoothed and the edge quantity in a high frequency range is almost 0.

The adaptive edge enhancement circuit 223 multiplies the output of the Laplacian 2231 by the output of the edge quantity filter 2232 and adds the multiplied value to the pixel of interest using an adder, to enhance the edge of the pixel of interest.

The adaptive edge enhancement circuit 223 binarizes the output value of the edge quantity filter 2232 using an appropriate threshold value and sends the signal (z) indicating the edge area along with the RGB signal or the X signal to the data interface unit 23 for use to create a histogram in an original type recognizing unit 51 in the subsequent stage.

As described above, the adaptive edge enhancement circuit 223 performs the process of applying contrast to a dot character or a character on a colored background and enhancing the edge of the picture (dots, photograph) to acquire a clear image. On the other hand, the adaptive edge enhancement circuit 223 does not perform edge enhancement on other dot areas and enables reproduction of a smooth image without unevenness.

That is, since the filter processing unit 22 smoothes a dot and does not detect the dot as an edge so as not to enhance the edge and smoothes dots around a character to enhance a character edge, it is possible to acquire a clear image.

The image compression processing device 5 will be described below. As illustrated in FIG. 1, the image compression processing device 5 includes an original type recognizing unit 51 and an image compressing unit 52.

First, the original type recognizing unit 51 will be described below.

Before the image compression in the image compressing unit 52, the original type recognizing unit 51 determines which of the following four types an original of interest belongs to using a histogram of pixel values of the original associated with the output (the RGB signal, the z signal) subjected to the spatial filtering by the filter processing unit 22. The original type recognizing unit 51 determines whether there is a possibility that an outline character is present in a newspaper original. Whether there is a possibility that an outline character is present is not limited to the newspaper original, but may be determined for a thin original which is an output image in a toner save mode and the other original which is an image such as a picture.

Figure 10:
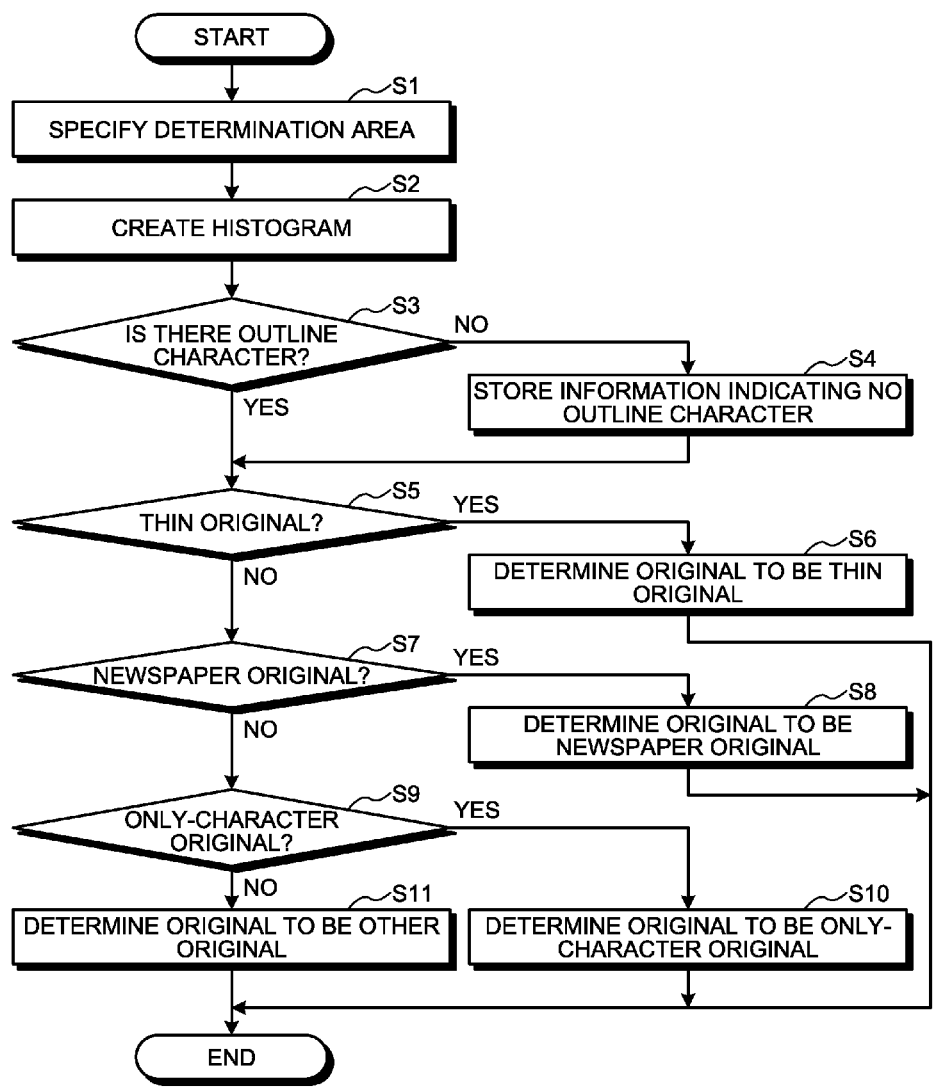
FIG. 10 is a flowchart schematically illustrating a flow of an original type recognizing process in an original type recognizing unit.

Only-character original
Newspaper original (with an outline character)
Newspaper original (without an outline character)
Thin original
Other original FIG. 10 is a flowchart schematically illustrating a flow of an original type recognizing process in the original type recognizing unit 51.

Figure 11:
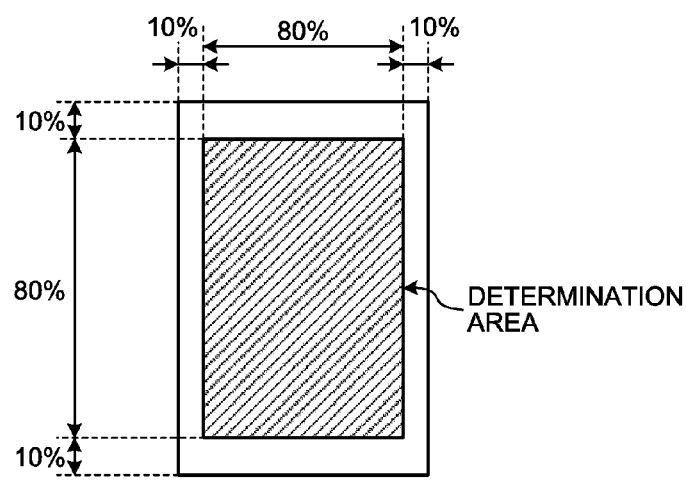
FIG. 11 is a schematic view illustrating a determination area on an original which is used to create a histogram.

As illustrated in FIG. 10, the original type recognizing unit 51 first specifies a determination area on an original associated with original type recognition (Step S1). More specifically, the original type recognizing unit 51 specifies a determination area on an original which is used to create a histogram of one screen in Step S2 subsequent thereto. There are two areas which are not used to create a histogram on the original. FIG. 11 is a schematic view illustrating a determination area on the original which is used to create a histogram. As illustrated in FIG. 11, the first area is an area within 10% from edges on the upper, lower, right, and left sides of the original. The second area is an area except for the pixels in which the z signal indicating the edge area is active, that is, an edge portion of the image on the original. Inclusion of an original shadow or the like is excluded from the former and inclusion of an intermediate pixel between a character and a background is excluded from the latter. An intermediate pixel between a character and a background is not a picture but may be erroneously determined to be a picture and thus is excluded from the determination area in advance.

Figure 12:
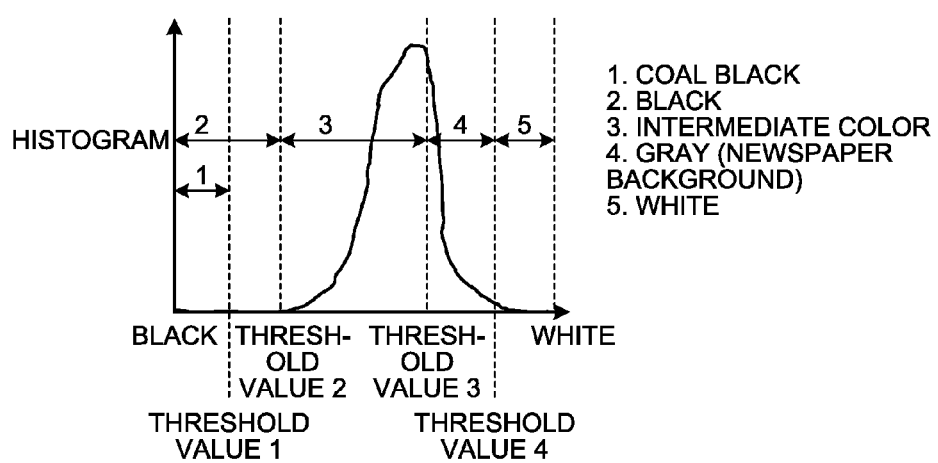
FIG. 12 is a diagram illustrating an example in which a histogram is created.

Subsequently, the original type recognizing unit 51 quantizes the pixel value of a pixel of interest using plural threshold values and then creates a histogram (Step S2). That is, the original type recognizing unit 51 also serves as a histogram creating unit. FIG. 12 is a diagram illustrating a creation example of a histogram. As illustrated in FIG. 12, the original type recognizing unit 51 counts the number of pixels for each density in the determination area on the original associated with the output (the RGB signal, the z signal) subjected to the spatial filtering by the filter processing unit 22 to create a histogram and determines a peak value from the created histogram. As illustrated in FIG. 12, the original type recognizing unit 51 classifies the density into five values as described below using four threshold values (threshold value 1 to threshold value 4) which are determined by experiment or the like.

1. Coal black
2. Black
3. Intermediate color
4. Newspaper background color (gray)
5. White A method of determining each threshold value will be described below.

[Threshold Value of 1. Coal Black and 2. Black]
Threshold value 1 defining "1. Coal black" is set to be smaller than a character color of a newspaper.
[Influence to Determination of a Newspaper Original]
[Threshold Value of 2. Black and 3. Intermediate Color]
This threshold value is used to classify a character color of a newspaper into "2. Black". [Influence to determination of a newspaper original]
This threshold value is used to classify a character color of an only-character original (particularly a black character) into "2. Black". [Influence to determination of an only-character original]
This threshold value is used to classify a black character color of a thin original into "3. Intermediate color". [Influence to determination of a thin original]
[Threshold Value of 3. Intermediate Color and 4. Newspaper Background Color]
This threshold value is used to classify a newspaper background color into "4. Newspaper background color". [Influence to determination of a newspaper original]
[Threshold Value of 4. Newspaper Background Color and 5. White]
This threshold value is used to classify a white background color into "5. White". [Influence to determination of an only-character original]
This threshold value is used to classify an outline character into "5. White". [Influence to determination of an outline character]

Subsequently, the original type recognizing unit 51 determines whether an outline character is present (Step S3). In the character area, because an outline character is thicker than a black character and an edge portion of an image is excluded in specifying the determination area (Step S1), the outline character is counted as "5. White". Therefore, the original type recognizing unit 51 determines that an outline character is present when an outline character in the character area is counted as "5. White" using this characteristic (YES in Step S3).

On the other hand, when it is determined that an outline character is not present (NO in Step S3), the original type recognizing unit 51 temporarily stores information indicating that an outline character (or a white background) is not present and uses the stored information to detect an outline character of a newspaper original, a thin original, and the other original (Step S4).

Subsequently, the original type recognizing unit 51 determines whether the original is a thin original (Step S5). Most of the thin original is occupied by "3. Intermediate color" to "5. White" and "1. Coal black" and "2. Black" are small. Therefore, the original type recognizing unit 51 determines the counted values using the threshold values on the basis of this characteristic. When it is determined that the original is a thin original (YES in Step S5), the original type recognizing unit 51 determines that the type of the original is a "thin original" in Step S6.

Subsequently, when it is determined that the original is not a thin original (NO in Step S5), the original type recognizing unit 51 determines whether the original is a newspaper original (Step S7). Most of the newspaper original is occupied by "4. Newspaper background color" and "1. Coal black" and "3. Intermediate color" are small. Therefore, the original type recognizing unit 51 determines the counted values using the threshold values on the basis of this characteristic. When it is determined that the original is a newspaper original (YES in Step S7), the original type recognizing unit 51 determines that the type of the original is a "newspaper original" in Step S8.

Subsequently, when it is determined that the original is not a newspaper original (NO in Step S7), the original type recognizing unit 51 determines whether the original is an only-character original (Step S9). Most of the only-character original is occupied by "1. Coal black," "2. Black," and "5. White" and "3. Intermediate color" and "4. Newspaper background color" are small. Therefore, the original type recognizing unit 51 determines the counted values using the threshold values on the basis of this characteristic. When it is determined that the original is an only-character original (YES in Step S9), the original type recognizing unit 51 determines that the type of the original is an "only-character original" in Step S10.

On the other hand, when it is determined that the original is not an only-character original" (NO in Step S9), the original type recognizing unit 51 determines that the type of the original is "the other original" in Step S11. That is, the original type recognizing unit 51 determines that the original which is determined not to be a thin original, not to be a newspaper original, and not to be an only-character original is the other original.

The image compressing unit 52 will be described below. The image compressing unit 52 is a high-compressed PDF creating device.

The image compressing unit 52 receives the determination result $X_{moji}$ (a character/non-character [picture]) and the determination result $X_{iro}$ (a chromatic color/achromatic color) from the image area dividing unit 21 which have been temporarily stored in the HDD 3 and the density-linear signal (the RGB signal) subjected to the γ correction and creates data for a high-compressed PDF file.

Creation of a high-compressed PDF file in the image compressing unit 52 receiving the original type recognition result from the original type recognizing unit 51 will be described below.

First, the summary of the high-compressed PDF will be described below.

The high-compressed PDF is an image compression technique of creating a high-compressed PDF file from an image including line drawing such as a character. Here, the line drawing refers to an object which is expressed by a character and a line which can be preferably treated as the same as the character. An object which is expressed by a line but can be preferably treated as a picture is included in the picture, not in the line drawing. The picture is an object other than the line drawing, that is, an object such as a photograph which is expressed by dots or an object such as a graphic form which is not preferably treated as the same as the character.

Figure 13:
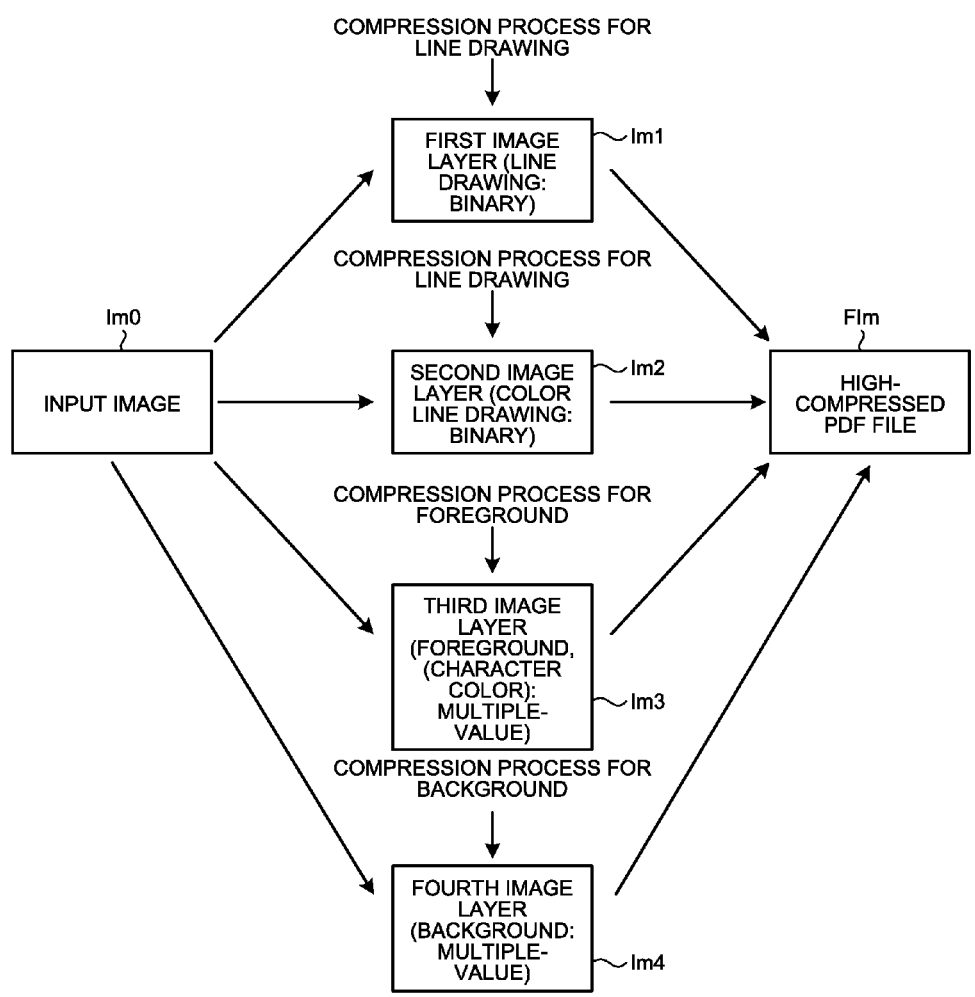
FIG. 13 is a schematic diagram illustrating a procedure of processing a high-compressed PDF file.
Figure 15A:
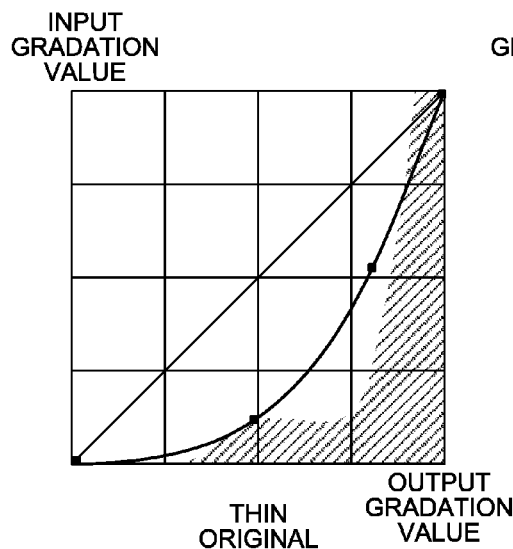
FIGS. 15A to 15D are diagrams illustrating an example of a γ correction table for each original type.
Figure 15B:
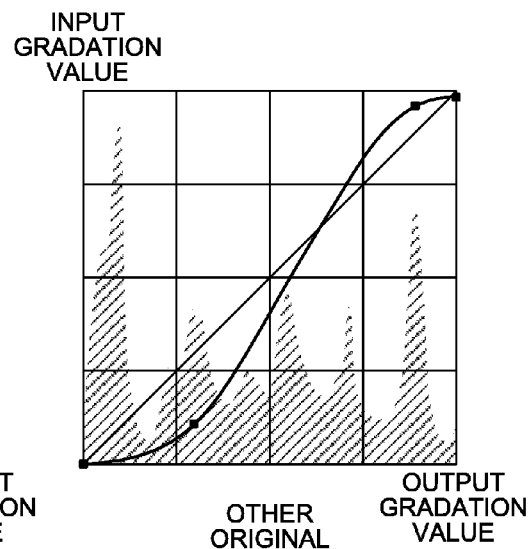
Figure 15C:
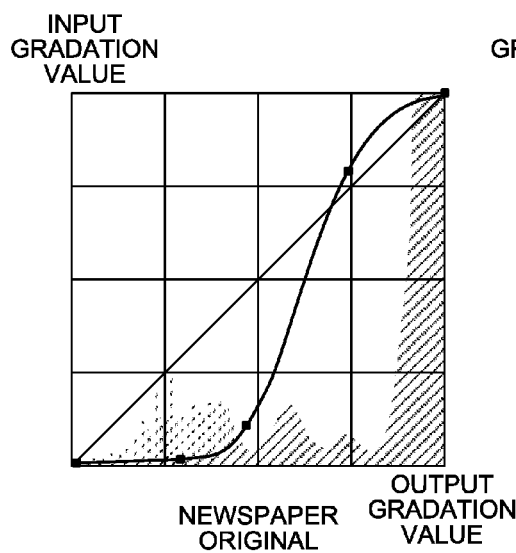
Figure 15D:
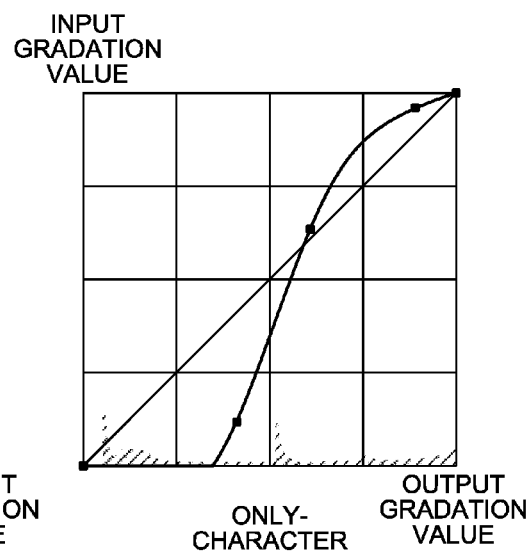

FIG. 13 is a schematic diagram illustrating a processing sequence of the high-compressed PDF. In creating a high-compressed PDF file, first, a first image layer (a black character layer) Im1 which is a binary image including only the line drawing of a black character, a second image layer (a color character layer) Im2 which is a binary image including only the line drawing of a color character, a third image layer (a foreground layer) Im3 which is a multi-value image expressing a character color (foreground) of the line drawing, and a fourth image layer (a background layer) Im4 which is a multi-value image expressing a picture (background) other than the line drawing are created from an image (hereinafter referred to as an "input image") Im0 to be processed. Then, a compression process suitable for compression of the line drawing is performed on the first image layer Im1 and the second image layer Im2, and a compression process suitable for compression of a foreground (a character color) or a background is performed on the third image layer Im3 and the fourth image layer Im4. Thereafter, for example, the first image layer Im1 subjected to the compression process, the second image layer Im2 subjected to the compression process, the third image layer Im3 subjected to the compression process, and the fourth image layer Im4 subjected to the compression process are synthesized into one image file in the PDF format, to create a high-compressed PDF file FIm corresponding to the input image Im0.

The compression process performed on the first image layer Im1 and the second image layer Im2 is, for example, a compression process using an encoding method such as MMR on a binary image. The compression process performed on the third image layer Im3 and the fourth image layer Im4 is, for example, a compression process using an encoding method such as JPEG on a multi-value image. The compression process on the first image layer Im1 and the compression process on the second image layer Im2 are common as a compression process suitable for compression of the line drawing and thus these processes are generically referred to as a "first compression process" in the following description. On the other hand, the compression processes on the third image layer Im3 and the fourth image layer Im4 are common as a compression process suitable for compression of a picture or a background and thus these processes are generically referred to as a "second compression process" in the following description for the purpose of distinction from the first compression process suitable for compression of the line drawing. The above-mentioned encoding methods are only an example and the compression process may be performed using an encoding method other than the above-mentioned encoding methods.

In the high-compressed PDF, an input image Im0 to be processed is divided into a line drawing area and the other area of a picture or a background, the first compression process is performed on the line drawing area, and the second compression process is performed on the other area of a picture or a background other than the line drawing, to enhance compression efficiency. Here, the compression efficiency refers to how to increase a compression ratio without damaging image quality (reproducibility) when an image is reproduced. When a high compression ratio is obtained while maintaining reproducibility, this means that efficient compression is performed.

The above-mentioned high-compressed PDF can be modified in various forms.

An image compressing process in the image compressing unit 52 will be described below.

FIG. 14 is a flowchart illustrating an example of a flow of the image compressing process in the image compressing unit 52. As illustrated in FIG. 14, first, the image compressing unit 52 performs γ correction on an original (an input image) using a γ correction parameter based on the pattern of the original type (Step S31).

Now, a relationship between the pattern of the original type and the γ correction will be described below. The order in which the background color is made deeper by the γ correction is as follows:

Thin original>other original>=newspaper original with an outline character=newspaper original without an outline character>only-character original.

FIGS. 15A to 15D are diagrams illustrating an example of a γ correction table for defining the γ correction parameter of each original type.

1. Only-Character Original

An only-character original is assumed to be an original in which only low-luminance characters are present on a white background. Accordingly, in the case of the only-character original, a γ correction table (see FIG. 15D) in which the background is lighter and the characters are deeper is used. Accordingly, it is possible to improve readability.

2. Newspaper Original without Outline Character

In a newspaper original without an outline character, it can be predicted that the background of the newspaper is a high-luminance color and the characters are a low-luminance color. Accordingly, in the case of the newspaper original without an outline character, a γ correction table (see FIG. 15C) in which the background is lighter and the characters are deeper is used. Accordingly, it is possible to improve readability. Here, the γ correction table used here is gentler than for the only-character original. When background color removal is designated by a user, the background of the newspaper may be whitened and only the characters may be left. Accordingly, it is possible to decrease an amount of toner used to print a PDF file and to achieve environmental consideration.

3. Newspaper Original with Outline Character

In the case of a newspaper original with an outline character, a γ correction table in which characters such as outline characters are whitened is used. Accordingly, it is possible to improve readability. The γ correction table used here is gentler than for the only-character original.

4. Thin Original

In the case of a thin original, a γ correction table (see FIG. 15A) in which both the background and the character are deeper is used. Accordingly, it is possible to make the image look good. At this time, the original is deeper than the other original.

5. Other Original

In the case of the other original, a γ correction table (see FIG. 15B) in which the low luminance is darkened and the high luminance is brightened is used. Accordingly, it is possible to make a gradation difference between the background and the character and to make the image look good. Here, a loose γ correction table is used to prevent gradation from being damaged.

Subsequently, after performing the γ correction, the image compressing unit 52 creates the first image layer, the second image layer, the third image layer, and the fourth image layer using line drawing data (Step S32).

Figures 16, 17:
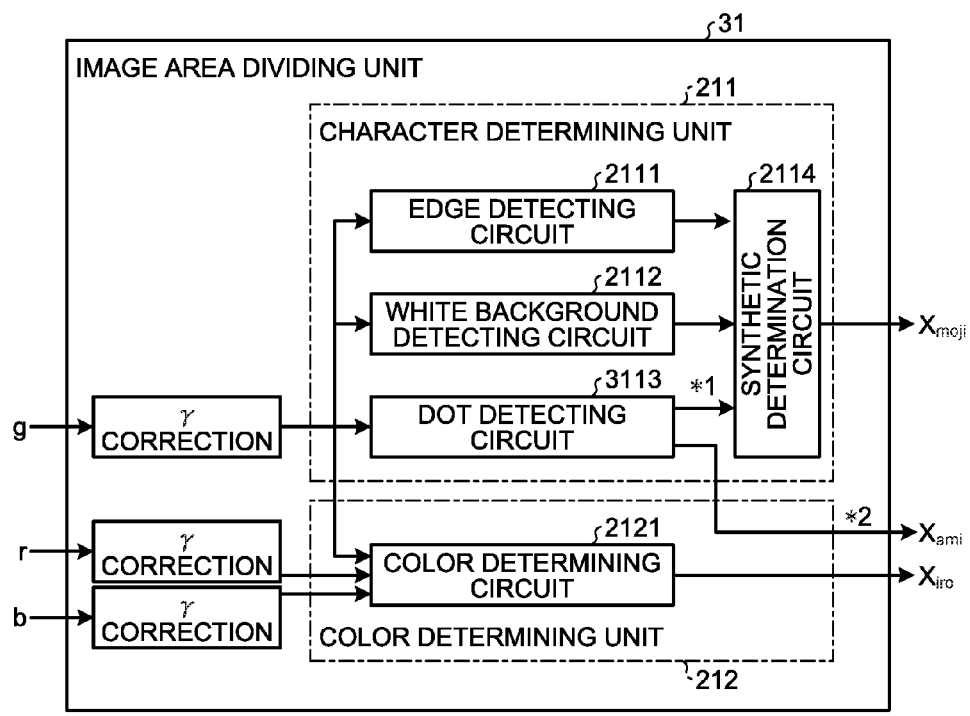
FIG. 16 is a diagram illustrating resolutions of layers which are changed depending on an original type.
FIG. 17 is a block diagram illustrating a configuration of an image area dividing unit according to a second embodiment.

Now, a relationship between a pattern of an original type and a resolution will be described below. FIG. 16 is a diagram illustrating a resolution of each layer which is changed depending on the original type. As illustrated in FIG. 16, the compression ratio of the background image layer (the fourth image layer) in an only-character original or the newspaper original is set to be higher. Since the only-character original or the newspaper original has a low possibility including a picture and has high character extraction accuracy, the setting of the compression ratio of the background to be high has a less influence on the image quality.

A quality factor (QF) of JPEG or the like may be changed depending on the original type instead of switching the resolution depending on the original type, to achieve a decrease in file size.

Subsequently, the image compressing unit 52 performs lossless compression such as MMR or JBIG2 on the first image layer and the second image layer and outputs the result (Steps S33 and S34). The image compressing unit 52 performs lossy compression such as JPEG or JPEG2000 on the third image layer and the fourth image layer and outputs the result (Steps S35 and S36).

According to this embodiment, the original type of an input image is recognized using a histogram which has created by quantizing pixel values of pixels of interest using plural threshold values, but since a smoothing process of removing dots more than a specific number of lines in a picture area and an edge enhancement process based on an edge quantity on an edge portion of a character area are performed as a pre-process thereof, at least four types of original types to be described below can be classified with a simple configuration using the same determination method:

Only-character Original;
Newspaper Original;
Thin Original; and
Other Original.

According to this embodiment, since the compression mode for the compression process of creating a high-compressed image file is controlled depending on the recognized original type, it is possible to realize high image quality, high compression, and fast compression.

In this embodiment, the example in which the processes for creating a high-compressed PDF file are controlled on the basis of the recognition result of the original type has been described above. However, this embodiment is not limited to this example, but even when a copied image is acquired by the scanner 1, the original type recognizing unit 51 may be operated and the color processing/UCR unit 24 or the printer correcting unit 25 in the subsequent stage of the image processing device 2 may be controlled using the result. For example, when it is determined that an original is a thin original, the printer correcting unit 25 can perform a γ correction process of reproducing an image deeper (so-called enhanced). Accordingly, it is possible to expect improvement in image quality of an image even at the time of printing-out.

Second Embodiment

A second embodiment will be described below. The same elements as described in the first embodiment will be referenced by the same reference numerals and description thereof will not be repeated.

In the first embodiment, dots have removed using the local smoothing filter in the smoothing circuit 221. However, when the smoothing process is locally performed, some rough dot lines cannot be completely removed. A dot originally has a binary structure. Accordingly, when the dots are not completely removed, the number of pixels having an intermediate value in a histogram decreases and a possibility that a dot picture portion will be determined to be a character area increases.

Therefore, in the second embodiment, features of a dot picture, particularly, an intermediate portion, will be noted to enhance determination accuracy of an only-character original. The second embodiment is different from the first embodiment, in that an original is not determined to be an only-character original without depending on the result of a histogram when a dot picture is clearly present in the original.

FIG. 17 is a block diagram illustrating a configuration of the image area dividing unit 31 according to the second embodiment. The image area dividing unit 31 illustrated in FIG. 17 divides an area of the data (r, g, and b subjected to A/D conversion: 8 bits for each color: reflectance-linear signal)) read by the scanner 1. The output X from the image area dividing unit 31 is a three-bit signal, and includes a character/non-character area signal, a color/non-color area signal, and a dot/non-dot area signal for original type recognition.

The dot detecting circuit 3113 of the image area dividing unit 31 outputs a determination result $X_{ami}$ which is dot division result 2 for reflection in the original type recognition to the filter processing unit 22 in addition to the output (dot division result 1) to the synthetic determination circuit 2114 described in the first embodiment. Dot division result 1 is intended to detect the entire dot area, that is, the area formed of dots. On the other hand, dot division result 2 is intended to detect a dot area in the vicinity of a dot ratio of 50% which is small in a dot character and great in a dot picture.

Figure 18:
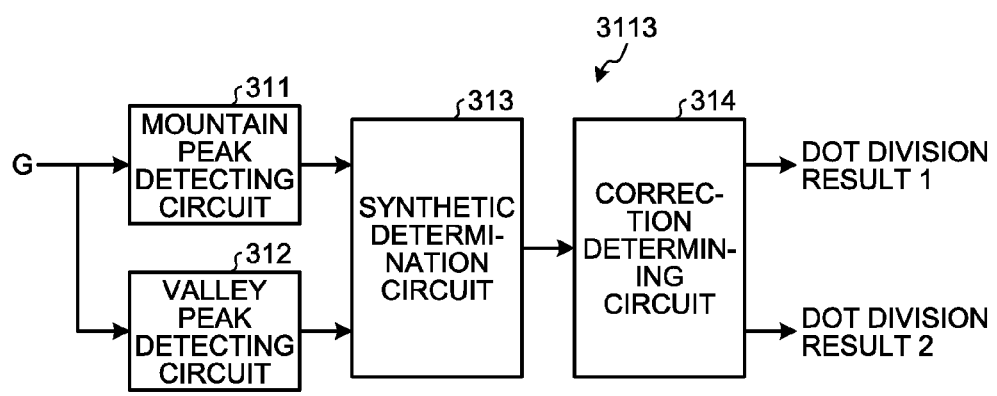
FIG. 18 is a block diagram illustrating a configuration of a dot detecting circuit.

Now, the dot detecting circuit 3113 will be described in detail. FIG. 18 is a block diagram illustrating the configuration of the dot detecting circuit 3113. As illustrated in FIG. 18, the dot detecting circuit 3113 includes a mountain peak detecting circuit 311, a valley peak detecting circuit 312, a synthetic determination circuit 313, and a correction determining circuit 314.

First, the output of dot division result 1 will be described below.

As illustrated in FIG. 18, the mountain peak detecting circuit 311 and the valley peak detecting circuit 312 sequentially apply a matrix with a size of 3×3 pixels (M=3), a matrix with a size of 4×4 pixels (M=4), or a matrix with a size of 5×5 pixels (M=5) as illustrated in FIGS. 3A to 3C to the pixels of the density-linear signal G subjected to the γ correction, and detects whether a center pixel $m_0$ (see FIGS. 3A to 3C) of the matrix is a peak indicating a mountain or a valley of a density variation on the basis of a density relationship with neighboring pixels $m_1$ to $m_j$. A threshold value which is used for the detection is defined as Δmth1.

Then, the synthetic determination circuit 313 divides the image using block B including N×N pixels (where N>M), for example, block B including 9×9 pixels (N=9) as illustrated in FIG. 4 as the unit.

Then, the synthetic determination circuit 313 counts the number of peak pixels (the number of mountain-peak pixels) indicating the mountain and the number of peak pixels (the number of valley-peak pixels) indicating the valley for each block, and determines the number of peak pixels of the larger counted value as the number of peak pixels of the block. Thereafter, the dot detecting circuit 2113 determines whether a center pixel $n_0$ (see FIG. 4) of the block of interest $B_0$ or all pixels $n_0$ to $n_{80}$ in the block of interest $B_0$ belong to a dot area on the basis of the relationship between the number of peak pixels $P_0$ of the block of interest $B_0$ illustrated in FIG. 5 and the number of peak pixels P of neighboring blocks $B_1$ to $B_8$ on upper/lower and right/left oblique sides around the block of interest. That is, the correction determining circuit 314 determines whether the block of interest is a dot block on the basis of the number of peaks in each of the block of interest and the neighboring blocks, and outputs dot division result 1.

The output of dot division result 2 will be described below.

Features of a dot character (which may be included in an original to be determined as an only-character original) and a dot picture will be described now.

[1. Dot Character]
Two-dimensional enlargement is small (which is a character and thus is thin)
A possibility of an intermediate density being included is low (a possibility of both a mountain-peak pixel and a valley-peak pixel being locally included is low)

[2. Dot Picture]
Two-dimensional enlargement is possible (which is a picture and thus generally has a large area)
A possibility of an intermediate density being included is high In this embodiment, an example of a process of detecting a dot block which is a part of a dot picture will be described below on the basis of the above-mentioned features of the dot character and the dot picture. This embodiment is based on an idea that dot characters of a checker shape (with a dot ratio of 50%) is considered to be small and a character will not have a large area even if exists.

When dot division result 2 is acquired, the mountain peak detecting circuit 311 and the valley peak detecting circuit 312 switch a threshold value which is used to detect a peak indicating a mountain or a valley of the density variation (a mounting-peak pixel or a valley-peak pixel) to Δmth2 (Δmth2>Δmth1). This switching of the threshold value is to limit a dot in the vicinity of an intermediate density because a mountain height and a valley depth of a dot in the vicinity of the intermediate density are larger than in a highlighted portion and a dark portion, respectively.

In the dots in the vicinity of the intermediate density, the number of mountain peaks and the number of valley peaks are substantially equal to each other. Therefore, when dot division result 2 is acquired, the synthetic determination circuit 313 can calculate the number of peaks in the related art only when the difference between the number of mountain peaks and the number of valley peaks satisfies this condition, and can output the number of peaks as "0" when the condition is not satisfied.

Alternatively, when dot division result 2 is acquired, the synthetic determination circuit 313 can calculate an average value of the G signals of the block of interest (8×8 pixels), can determine that the block of interest is an intermediate-density block when the average value is within a certain range, can calculate the number of peaks in the related art only when this condition is satisfied, and can output the number of peaks as "0" when this condition is not satisfied.

A dot picture is present in a broader area than a dot character. Therefore, when dot division result 2 is acquired, the correction determining circuit 314 switches the threshold value to be used to a value larger than a threshold value at the dot division result 1 in the related art.

Figure 19:
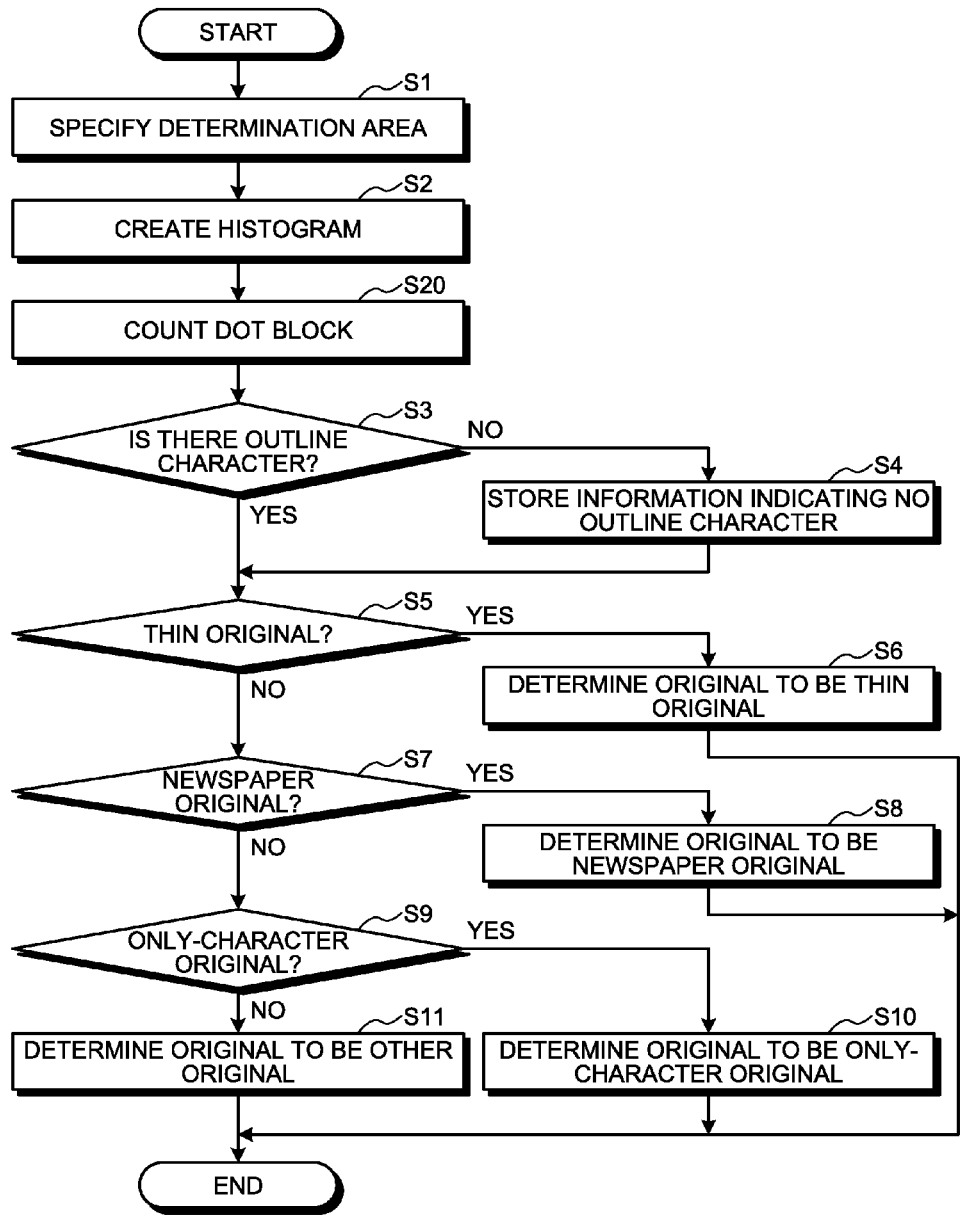
FIG. 19 is a flowchart schematically illustrating a flow of an original type recognizing process in an original type recognizing unit.
Figure 20A:
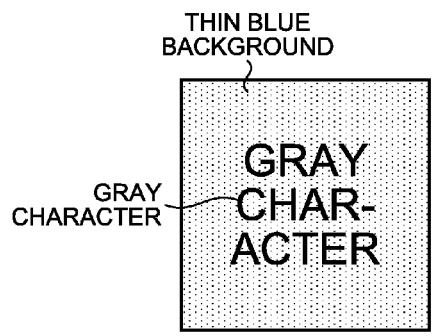
FIGS. 20A to 20F are views illustrating pattern examples of a "thin original" which is determined by the original type recognizing unit.
Figure 20B:
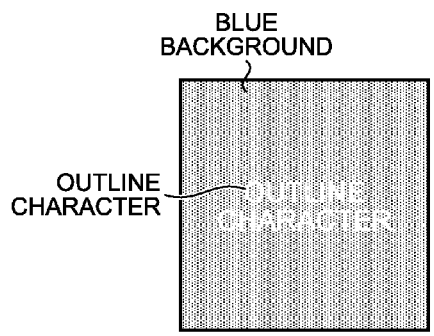
Figure 20C:
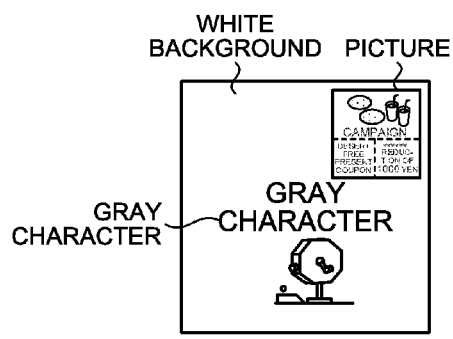
Figure 20D:
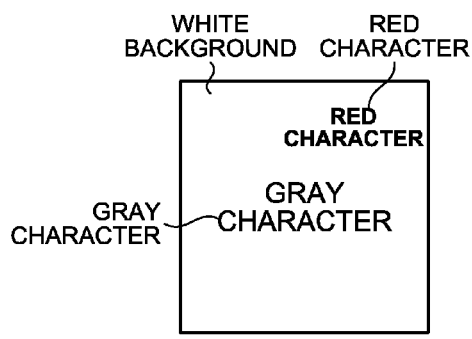
Figure 20E:
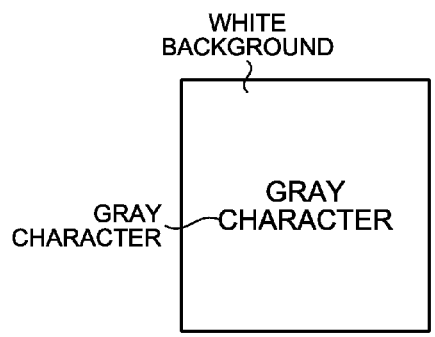
Figure 20F:
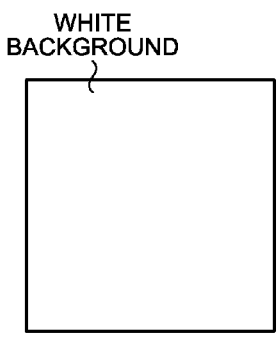
Figure 21A:
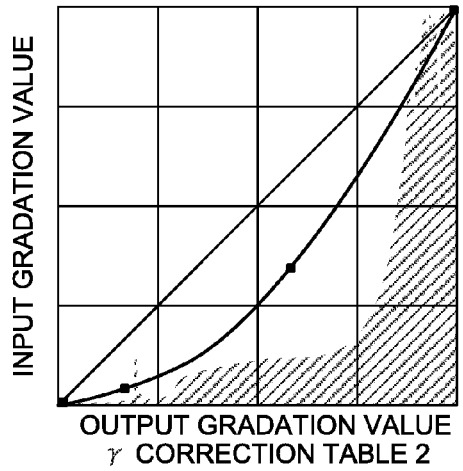
FIGS. 21A to 21D are diagrams illustrating an example of a γ correction table of each pattern of a thin original type.
Figure 21B:
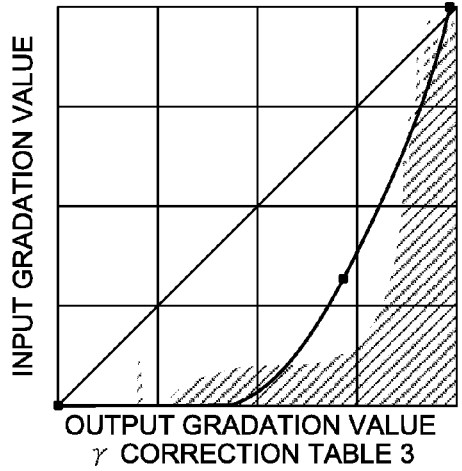
Figure 21C:
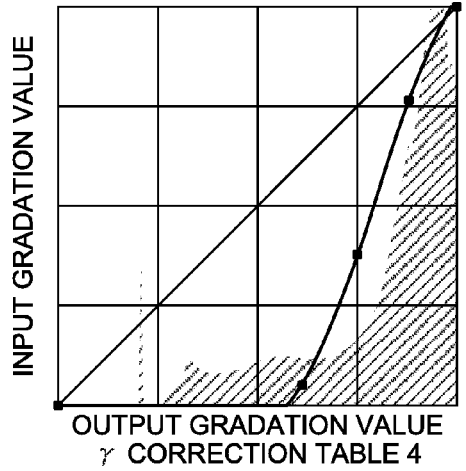
Figure 21D:
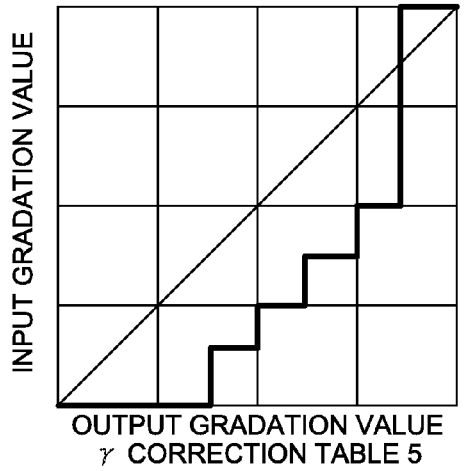

The processing in the original type recognizing unit 51 of the image compression processing device 5 according to this embodiment will be described below. FIG. 19 is a flowchart schematically illustrating a flow of an original type recognizing process in the original type recognizing unit 51.

The original type recognizing unit 51 creates a histogram (Step S2) and then counts dot blocks (Step S20). More specifically, in Step S20, the original type recognizing unit 51 counts the number of active blocks in the determination result $X_{ami}$.

Then, in determining whether the original is an only-character original in Step S9, the original type recognizing unit 51 can determine that the original is not an only-character original when the counted value is equal to or greater than a predetermined number.

That is, as illustrated in the flowchart of FIG. 19, when the original is not a thin original (NO in Step S5), the original is not a newspaper original (NO in Step S7), and the original includes a dot intermediate density portion, it is determined that the original is not an only-character original (NO in Step S9) but is the other original (Step S11).

According to this embodiment, when an input image includes dot picture areas equal to or greater than a predetermined number, the original is recognized as an original type including a picture regardless of the recognition result using a histogram. Accordingly, it is possible to classify an "only-character original" into the other original with higher accuracy. In determination of an "only-character original," since a dot with a large size which is not crushed through the smoothing process is similar to a character, such an original may be determined to be an only-character original in spite of a dot picture being included therein. However, since a dot picture area is actively determined, it is possible to enhance determination accuracy of an "only-character original."

Third Embodiment

A third embodiment will be described below. The same elements as described in the first embodiment or the second embodiment will be referenced by the same reference numerals and description thereof will not be repeated.

In the third embodiment, patterns of a "thin original" are more finely classified and a compression mode is controlled for each pattern.

FIGS. 20A to 20F are views illustrating an example of patterns of a "thin original" which is determined by the original type recognizing unit 51 according to the third embodiment. As illustrated in FIGS. 20A to 20F, the original type recognizing unit 51 classifies a thin original into the following patterns.

Thin original (a): Most is occupied by a background color (3. Intermediate color and 4. Newspaper background color) and an outline character is not present (5. White is equal to or less than a threshold value)

Thin original (b): Most is occupied by a background color (3. Intermediate color and 4. Newspaper background color) and an outline character is present (5. White is equal to or greater than a threshold value)

Thin original (c): It cannot be determined whether the thin original has a color background or a white background or the number of colors is large due to a picture or the like Thin original (d): Most is occupied by a white background (5. White) and the number of colors is two (gray+the other color)

Thin original (e): Most is occupied by a white background and the number of colors other than white is only one Thin original (f): a white background original or an almost white background original (with slight characters or the like)

The original type recognizing unit 51 switches a binarization method and a threshold value depending on the pattern of a thin original. Here, a technique of classifying a pixel into a line drawing candidate pixel when a difference from an average gradation value of neighboring pixels is equal to or greater than the threshold value is described as an example of dynamic threshold binarization.

In thin originals (a) and (b), it can be predicted that there is no gradation difference between a background and a line drawing. Accordingly, in thin originals (a) and (b), the original type recognizing unit 51 uses the dynamic threshold binarization of a considerably low threshold value. More specifically, this threshold value is a threshold value for picking up unevenness as much as possible.

In thin original (c), it can be predicted that there is a slight gradation difference between a background and a line drawing. Accordingly, in thin original (c), the original type recognizing unit 51 uses the dynamic threshold binarization of a low threshold value.

In thin originals (d) and (e), it can be predicted that there is a considerable gradation difference between background and a line drawing. Accordingly, in thin originals (d) and (e), the original type recognizing unit 51 uses static threshold binarization of a threshold value using a valley of a histogram. In thin originals (d) and (e), the number of colors needs to be considered for distinction from thin original (c). Accordingly, the original type recognizing unit 51 can determine thin originals (d) and (e) by counting the number of colors of the original as a whole to determine the color of each line drawing. In thin original (d), the line drawing colors may be unified into two colors in the original as a whole. In thin original (e), the line drawing color may be unified into one color in the original as a whole.

In thin original (f), it can be predicted that there is a considerable gradation difference between a background and a line drawing, but there is a possibility that no valley is present in the histogram. Accordingly, in thin original (f), the original type recognizing unit 51 uses the static threshold binarization of a threshold value capable of determining color other than white.

The compression process on the pattern examples of a "thin original" in the image compressing unit 52 will be described below.

The image compressing unit 52 performs γ correction on an original. The image compressing unit 52 switches a γ correction parameter depending on the pattern of the thin original type. The purpose of the γ correction depending on the pattern of the thin original type will be described below.

FIGS. 21A to 21D are diagrams illustrating an example of a γ correction table in which γ correction parameters of the patterns of the thin original type are defined.

[Thin Originals (a) and (b)]

Since there is a little white in the original, use of γ correction table 3 illustrated in FIGS. 21A to 21D increases the file size. Accordingly, γ correction table 2 is used. γ correction tables 2, 3, and 4 make an image deeper as a whole. The increase of the numeral refers to darkening.

[Thin Original (c)]

Since there is much white in the original, use of γ correction table 3 illustrated in FIGS. 21A to 21D does not greatly increase the file size. Accordingly, γ correction table 3 is used. The γ correction tables of thin originals (a), (b), and (c) may be calculated depending on the number of pixels in the white area and a change in file size may be suppressed.

[Thin Original (d)]

Since this original has a white background and a character can be easily separated from the background, use of γ correction table 4 does not increase the file size.

[Thin Original (e)]

Since a character can be more easily separated from the background in comparison with thin original (d), a table which makes an image deeper than γ correction table 4 may be used. When only white remains in the background, the entire background may be whitened.

[Thin Original (f)]

When only white remains in the background, the entire background may be whitened. As in γ correction table 5, gradation characteristics may be reduced to decrease the file size. γ correction table 5 has a purpose of decreasing the gradation characteristics and has a stepped image. The gradation characteristics and the file size have a trade-off relationship.

A relationship between a pattern of a thin original type and a resolution in the image compressing unit 52 will be described below. FIG. 22 is a diagram illustrating resolutions of layers which are switched depending on the pattern of a thin original type. As illustrated in FIG. 22, since there is a high possibility that thin originals (a), (b), and (c) include a picture, the image compressing unit 52 cannot decrease the resolution of the background much. Since there is a possibility that thin original (d) includes a picture, the image compressing unit 52 slightly decreases the resolution of the background. Since there is a low possibility that thin originals (e) and (f) include a picture, the image compressing unit 52 decreases the resolution of the background much.

There is a possibility that thin originals (d) and (e) do not include a black character but include only color characters. In thin originals (d) and (e), the image compressing unit 52 may not use a black character layer but may use only a color character layer. Accordingly, a PDF file of four layers can be switched to three layers to achieve a decrease in file size.

There is a possibility that thin original (e) does not include a color character but includes only black characters. In thin original (e), the image compressing unit 52 may not use a color character layer but may use only a black character layer. Accordingly, a PDF file of four layers can be switched to three layers to achieve a decrease in file size. Since black characters can be printed in a single color of K, it is possible to achieve a decrease in toner which is used to print the PDF file.

According to this embodiment, it is possible to achieve a decrease in file size in comparison with a case in which an image is simply corrected by automatic density correction using a luminance value or the like at the time of image compression of a thin original.

Figure 23:
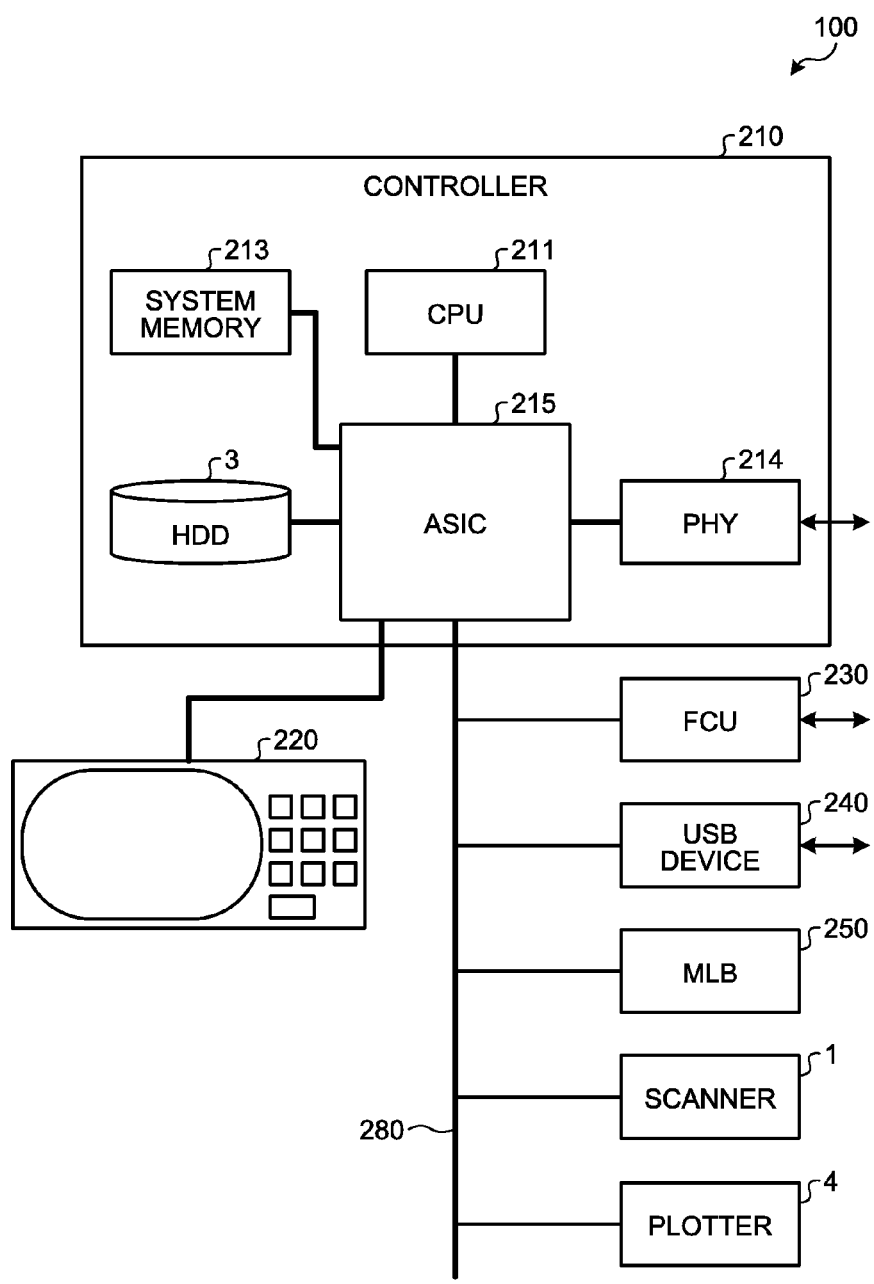
FIG. 23 is a block diagram illustrating an example of a hardware configuration of an image forming apparatus.

FIG. 23 is a block diagram illustrating an example of a hardware configuration of the image forming apparatus 100. The image forming apparatus 100 described in the first to third embodiments includes a controller 210, an operation panel 220, a facsimile control unit (FCU) 230, a universal serial bus (USB) device 240, a media link board (MLB) 250, a scanner 1, and a plotter 4, for example, as illustrated in FIG. 23.

The operation panel 220 is a user interface that receives various setting inputs from a user using the image forming apparatus 100 or displays a variety of information to be presented to the user. Selection of an operation mode by the user is performed, for example, using the operation panel 220.

The FCU 230 is a control unit that controls a facsimile function of the image forming apparatus 100. The USB device 240 is a device that is connected to the image forming apparatus 100 via a USB. The MLB 250 is a conversion board that converts a format of image data. The scanner 1 is an engine that reads an original, and the plotter 4 is an engine that performs printing. In this embodiment, it is assumed that the scanner 1 is made to read an original to acquire an image to be processed.

The controller 210 is a control device that controls the operation of the image forming apparatus 100. As illustrated in FIG. 23, the controller 210 includes a central processing unit (CPU) 211, a system memory 213, an HDD 3, a physical layer (PHY: a physical layer of a communication-relevant circuit) 214, and an application specific integrated circuit (ASIC) 215. The operation panel 220 is connected to the ASIC 215 of the controller 210. The FCU 230, the USB device 240, the MLB 250, the scanner 1, and the plotter 4 are connected to the ASIC 215 of the controller 210 via a data transmission bus 280.

In the image forming apparatus 100 described above in the first to third embodiments, some or all of functional elements as the image processing device are mainly embodied by the controller 210. That is, among the functional elements described above in the first to third embodiments, the image processing device 2 is implemented, for example, by the ASIC 215 of the controller 210. For example, the CPU 211 of the controller 210 is made to execute a predetermined program (software) using the system memory 213, to implement the image compression processing device 5.

The program is provided in a state in which the program is recorded on a computer-readable recording medium such as a CD-ROM, a flexible disk (FD), a CD-R, or a DVD as a file in a format which can be installed or executed in the image forming apparatus 100. The program may be stored in a computer connected to a network such as the Internet and downloaded into the image forming apparatus 100 via the network, to provide the program. The program may be provided or distributed via a network such as the Internet. The program may be provided, for example, in a state in which the program is installed in the system memory 213 or the HDD 3 in the image forming apparatus 100.

In the first to third embodiments, it has been assumed that the image forming apparatus 100 is embodied as a single apparatus, but the functional elements of the image forming apparatus 100 may be distributed into plural devices which are physically separated and the operation of the image forming apparatus 100 may be realized by cooperation of the plural devices.

In the first to third embodiments, it has been described that the image compressing device according to the invention is applied to a multifunction peripheral having at least two functions of a copier function, a printer function, a scanner function, and a facsimile function, but the image compressing device according to the invention can be applied to any image forming apparatus such as a copier, a printer, a scanner, and a facsimile.

According to an embodiment, it is possible to control a compression mode of a compression process for creating a high-compressed image file depending on a recognized original type (for example, only-character original/newspaper original/thin original/other originals), to realize high image quality, high compression, and fast compression.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image compressing device comprising:
at least one memory including computer readable instructions; and
at least one processor configured to execute the computer readable instructions to,
create a histogram regarding an input image,
recognize an original type of the input image using the histogram, and
perform an image compression process for creating a high-compressed image file from the input image by,
performing gradation correction on the input image based on the original type,
separating the input image, after the gradation correction, into a line drawing area and another area,
performing a first compression process on the line drawing area, and
performing a second compression process on the another area, the second compression process being different from the first compression process.

2. The image compressing device according to claim 1, wherein processor is further configured to execute the computer readable instructions to recognize the original type of the input image by recognizing the original type of the input image based on at least a result of quantizing the histogram, using a plurality of threshold values.

3. The image compressing device according to claim 1, wherein the processor is further configured to execute the computer readable instructions to
recognize the original type of the input image by recognizing a thin original which is an output image in a toner save mode, using the histogram, and
perform the image compression process such that a background color and a character of the thin original are made deeper.

4. The image compressing device according to claim 1, wherein the processor is further configured to execute the computer readable instructions to
recognize the original type of the input image by determining presence or absence of an outline character to recognize the original type, and
perform the image compression process by performing different compression processes for original types which are distinguished based on the presence or absence of the outline character.

5. The image compressing device according to claim 1, wherein the processor is further configured to execute the computer readable instructions to
recognize the original type of the input image by further recognizing a plurality of patterns of a thin original which is an output image in a toner save mode, and
perform the image compression process in accordance with the plurality of patterns of the thin original.

6. The image compressing device according to claim 5, wherein the processor is further configured to execute the computer readable instructions to recognize the original type of the input image by calculating a number of colors of line drawing colors in the input image and recognize the plurality of patterns of the thin original using the number of colors and the histogram.

7. The image compressing device according to claim 5, wherein the processor is further configured to execute the computer readable instructions to perform the image compression process by switching a threshold value for a difference in average gradation value from neighboring pixels and a mode of binarization using the threshold value depending on at least the plurality of patterns of the thin original, the threshold value being used to separate a character and a background in the input image.

8. The image compressing device according to claim 1, wherein the processor is further configured to execute the computer readable instructions to perform the image compression process by switching resolutions of a foreground layer which is a multi-value image rendering a foreground as a character color constituting the high-compressed image file and a background layer which is a multi-value image rendering a background.

9. The image compressing device according to claim 1, wherein the processor is further configured to execute the computer readable instructions to perform the image compression process by switching a γ correction parameter used for γ correction to the input image.

10. The image compressing device according to claim 1, wherein the processor is further configured to execute the computer readable instructions to perform the image compression process by switching a number of layers constituting the high-compressed image file.

11. An image forming apparatus comprising the image compressing device according to claim 1.

12. An image compressing method performed by an image compressing device, the image compressing method comprising:
creating a histogram regarding an input image;
recognizing an original type of the input image using the histogram; and
performing an image compression process for creating a high-compressed image file from the input image by,
performing gradation correction on the input image based on the original type recognized at the recognizing of the original type,
separating the input image after the gradation correction into a line drawing area and another area,
performing a first compression process on the line drawing area, and
performing a second compression process on the another area, the second compression process being different from the first compression process.

13. The image compressing method according to claim 12, wherein the recognizing of the original type includes recognizing the original type of the input image based on at least a result of quantizing the histogram, using a plurality of threshold values.

14. The image compressing method according to claim 12, wherein
the recognizing of the original type includes recognizing using the histogram a thin original which is an output image in a toner save mode, and
the performing of the image compressing process such that a background color and a character of the thin original are made deeper.

15. The image compressing method according to claim 12, wherein
the recognizing of the original type includes recognizing presence or absence of an outline character, and
the performing of the image compressing process includes performing different compression processes for original types.

16. The image compressing method according to claim 12, wherein
the recognizing of the original type includes recognizing a plurality of patterns of a thin original, the thin original being an output image in a toner save mode, and
the performing of the image compressing process is performed based on the plurality of patterns of the thin original.

17. The image compressing method according to claim 16, wherein the recognizing of the original type includes
calculating a number of colors of line drawing colors in the input image and
recognizing the plurality of patterns of the thin original using the number of colors and the histogram.

18. The image compressing method according to claim 16, wherein
the performing of the image compressing process includes switching a threshold value for a difference in average gradation value from neighboring pixels and a mode of binarization using the threshold value based on the plurality of patterns of the thin original, the threshold value being used to separate a character and a background in the input image.

19. The image compressing method according to claim 12, wherein the performing of the image compressing process includes switching resolutions of a foreground layer and a background layer, the foreground layer being a multi-value image rendering a foreground as a character color constituting the high-compressed image file, and the background layer being a multi-value image rendering a background.

20. A non-transitory computer-readable recording medium including programmed instructions that when executed by a processor cause the processor to:
create a histogram regarding an input image,
recognize an original type of the input image using the histogram, and
perform an image compression process for creating a high-compressed image file from the input image by,
performing gradation correction on the input image based on the original type,
separating the input image, after the gradation correction, into a line drawing area and another area,
performing a first compression process on the line drawing area, and
performing a second compression process on the another area, the second compression process being different from the first compression process.

* * * * *